(12) United States Patent
Masuda et al.

(10) Patent No.: US 10,684,234 B2
(45) Date of Patent: Jun. 16, 2020

(54) METHOD FOR INSPECTING ROTARY MACHINE, AND ROTARY MACHINE

(71) Applicant: MITSUBISHI HEAVY INDUSTRIES COMPRESSOR CORPORATION, Tokyo (JP)

(72) Inventors: Yuji Masuda, Hiroshima (JP); Shinichiro Tokuyama, Hiroshima (JP)

(73) Assignee: MITSUBHISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 123 days.

(21) Appl. No.: 15/561,913

(22) PCT Filed: Mar. 31, 2015

(86) PCT No.: PCT/JP2015/060203
§ 371 (c)(1),
(2) Date: Sep. 26, 2017

(87) PCT Pub. No.: WO2016/157434
PCT Pub. Date: Oct. 6, 2016

(65) Prior Publication Data
US 2018/0119569 A1    May 3, 2018

(51) Int. Cl.
*G02B 23/24* (2006.01)
*G01N 21/954* (2006.01)
(Continued)

(52) U.S. Cl.
CPC ............. *G01N 21/954* (2013.01); *B08B 9/00* (2013.01); *B08B 9/0321* (2013.01);
(Continued)

(58) Field of Classification Search
None
See application file for complete search history.

(56) References Cited

U.S. PATENT DOCUMENTS 4,713,120 A * 12/1987 Hodgens, II ............. C23G 1/14
134/2
7,458,768 B2   12/2008 Dube et al.
(Continued)

FOREIGN PATENT DOCUMENTS

GB        2036363    *  6/1980
JP    S50-014527 A    2/1975
(Continued)

OTHER PUBLICATIONS

Translation of abstract of JP58174918 by Mitsubishi et al., published Oct. 14, 1983.*
(Continued)

*Primary Examiner* — Mikhail Kornakov
*Assistant Examiner* — Ryan L. Coleman
(74) *Attorney, Agent, or Firm* — Osha Liang LLP

(57) ABSTRACT

A method for inspecting a rotary machine having a fluid flow path includes a step of connecting an observation device to a connection port having an open/close valve that opens/closes a communication hole that communicates with the outside of the rotary machine and the flow path, the main body being connected to the connection port where the open/close valve is closed; a step of opening the open/close valve and inserting an insertion rod protruding from the main body of the observation device into the communication hole; a step of observing the inside of the flow path by an observation optical system provided at a leading end portion of the insertion rod; a step of withdrawing the insertion rod from the communication hole and closing the open/close valve; and a step of detaching the main body of the observation device from the connection port.

5 Claims, 5 Drawing Sheets

(51) Int. Cl.

| | | |
|---|---|---|
| *F04B 51/00* | (2006.01) | |
| *B08B 9/00* | (2006.01) | |
| *F04D 17/12* | (2006.01) | |
| *F04D 27/00* | (2006.01) | |
| *B08B 9/032* | (2006.01) | |
| *F01D 21/00* | (2006.01) | |
| *F01D 25/00* | (2006.01) | |

(52) U.S. Cl.
CPC ......... *F01D 21/003* (2013.01); *F01D 25/002* (2013.01); *F04B 51/00* (2013.01); *F04D 17/122* (2013.01); *F04D 27/001* (2013.01); *F05D 2260/607* (2013.01)

(56) References Cited

U.S. PATENT DOCUMENTS

| | | |
|---|---|---|
| 2006/0038988 A1 | 2/2006 | Thermos |
| 2008/0197120 A1* | 8/2008 | Beck ................. B23K 26/0604 219/121.71 |
| 2012/0186605 A1 | 7/2012 | Nakaniwa |
| 2014/0334916 A1 | 11/2014 | Snyder et al. |
| 2016/0011080 A1* | 1/2016 | Moore ................. F01D 25/285 73/112.01 |

FOREIGN PATENT DOCUMENTS

| | | | |
|---|---|---|---|
| JP | S54-019370 B | | 7/1979 |
| JP | 58174918 | * | 10/1983 |
| JP | 2011-089490 A | | 5/2011 |
| JP | 2011-111990 A | | 6/2011 |
| JP | 2011-153568 A | | 8/2011 |
| JP | 2013-199941 A | | 10/2013 |
| JP | 2014-141975 A | | 8/2014 |

OTHER PUBLICATIONS

International Search Report issued in corresponding International Application No. PCT/JP2015/060203 dated Jun. 16, 2015 (5 pages).
Written Opinion issued in corresponding International Application No. PCT/JP2015/060203 dated Jun. 16, 2015 (9 pages).

* cited by examiner

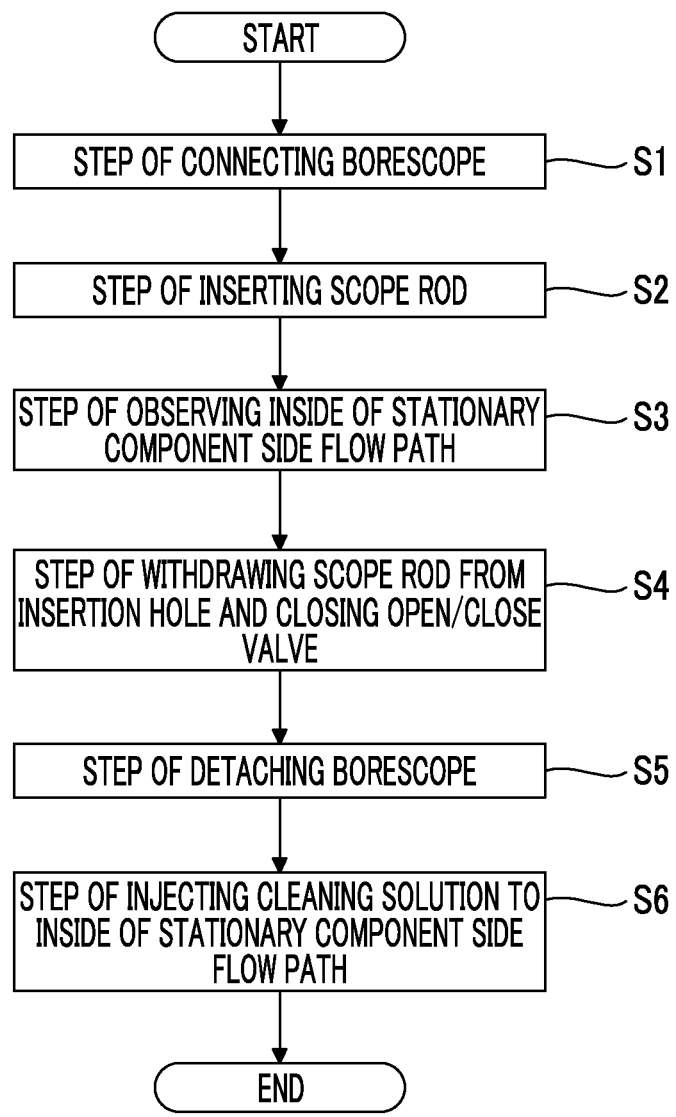

METHOD FOR INSPECTING ROTARY MACHINE, AND ROTARY MACHINE

TECHNICAL FIELD

The present invention relates to a method for inspecting a rotary machine and a rotary machine.

BACKGROUND ART

In various plants, a centrifugal compressor for pumping a process gas is used. In a case where a process gas is pumped by a centrifugal compressor, according to a kind of the process gas, components in the gas react and polymeric or coke-shaped solid matters may be generated in a flow path. In addition, an increase in a temperature of a process gas in a compression step may influence the generation of the solid matters.

If the solid matters attached to a flow path or a rotating member of a centrifugal compressor, the attached solid matters adversely affect a flow in the flow path or decrease performance. In addition, if attachment or separation of the solid matters is generated, balance in the rotating member is lost, which generates vibrations.

Accordingly, for example, PTL 1 discloses a configuration in which a spray-type nozzle is installed to remove solid matters attached to and deposited on a flow path of a centrifugal compressor and an atomized cleaning solution is injected into a flow path.

CITATION LIST

Patent Literature

[PTL 1] Japanese Unexamined Patent Application Publication No. 2014-141975

However, as described in PTL 1, in the configuration in which the cleaning solution is injected from the nozzle into the flow path, it is difficult to determine at what timing the cleaning solution should be injected. Therefore, in order to check the states of attachment and deposition of solid matters in the flow path, it is necessary to disassemble the centrifugal compressor or the like to directly view the inside of the flow path, which is troublesome and costly. In addition, during the checking work, it is not possible to operate the compressor, which generates a decrease in an operation rate.

SUMMARY OF INVENTION

One or more embodiments of the present invention provide a method for inspecting a rotary machine and a rotary machine capable of decreasing a labor and costs of maintenance and improving an operation rate of compressibility by easily checking states of attachment and deposition of solid matters in a flow path.

According to a first aspect of the present invention, there is provided a method for inspecting a rotary machine which is a method for inspecting a rotary machine having a flow path through which a fluid flows, the method including: a step of connecting a main body of an observation device to a connection port part having an open/close valve which opens/closes a communication hole which communicates with the outside of the rotary machine and the flow path, the main body being connected to the connection port part in a state where the open/close valve is closed; a step of opening the open/close valve and inserting an insertion rod protruding from the main body of the observation device into the communication hole; a step of observing the inside of the flow path by an observation optical system provided at a leading end portion of the insertion rod; a step of withdrawing the insertion rod from the communication hole and closing the open/close valve; and a step of detaching the main body of the observation device from the connection port part.

According to one or more embodiments of this configuration, it is possible to check states of attachment and deposition of solid matters in a gas flow path in a casing by inserting the observation device into the rotary machine from the outside to observe the inside of the flow path without disassembling the rotary machine.

In addition, since attachment and detachment of the observation device are performed in a state where the open/close valve provided in the connection port part is closed, it is possible to perform the inspection even in a state where the rotary machine is operated.

In the method for inspecting a rotary machine according to a second aspect of the present invention, in the first aspect, the method for inspecting a rotary machine may further include a step of connecting an injection device having an injection nozzle for injecting a cleaning solution to the connection port part and injecting the cleaning solution into the flow path in a case where it is determined that solid matters are to be removed from the inside of the flow path based on an observation image of the inside of the flow path obtained by the observation device.

In addition, in one or more embodiments, since the connection port part can be shared by the observation device and the injection device, if the connection port part for connecting the injection device is provided in the existing rotary machine, it is possible to inspect the attachment states of the solid matters by connecting the observation device to the connection port part. That is, one or more embodiments of the present invention can be also applied to the existing rotary machine to which the injection device can be attached, at low cost. In addition, it is possible to remove the solid matters by injecting the cleaning solution at appropriate timing using the injection device.

In the method for inspecting the rotary machine according to a third aspect of the present invention, in the first or second aspect, the connection port part may be provided so as to face a portion in which the flow path is curved or bent.

Accordingly, in one or more embodiments, it is possible to easily observe the portion at which the solid matters are easily attached and the flow path is curved or bent. In addition, it is possible to easily observe a flow path continued to one side of the portion in which the flow path is curved or bent or a flow path continued to the other side of the portion in which the flow path is cured or bent.

In addition, even when the leading end portion of the insertion rod is inserted into the flow path during the operation of the rotary machine, since the flow rate of the fluid is slow in the portion in which the flow path is curved or bent, it is possible to decrease loss applied to the flow of the fluid.

According to a fourth aspect of the present invention, there is provided a rotary machine, including: a casing in which a flow path through which a fluid flows and a communication hole which communicates with the flow path and the outside of the rotary machine are formed; an open/close valve which is provided outside the casing and opens/closes the communication hole; a tubular guide member which is connected to a side of the open/close valve separated from the casing and into which an insertion rod of an observation device is inserted; and a seal member which is provided on an inner peripheral surface of the guide member and seals a portion between the guide member and the insertion rod.

According to one or more embodiments of this configuration, it is possible to check states of attachment and deposition of solid matters in a gas flow path in a casing by inserting the observation device into the rotary machine from the outside to observe the inside of the flow path without disassembling the rotary machine.

In addition, even when the observation device is inserted into or withdrawn from the connection port part, the seal member can prevent the fluid inside the casing from leaking toward the outside.

In the rotary machine according to a fifth aspect of the present invention, in the fourth aspect, an injection device having an injection nozzle for injecting a cleaning solution to remove solid matters attached into the flow path may be connected to the open/close valve.

Accordingly, in one or more embodiments, since the connection port part can be shared by the observation device and the oil injection device, the present invention can be also applied to the existing rotary machine to which the oil injection device can be attached, at low cost. In addition, it is possible to remove the solid matters by injecting the cleaning solution at appropriate timing using the injection device.

According to one or more embodiments of the above-described method for inspecting a rotary machine and the rotary machine, it is possible to decrease a labor and costs of maintenance and improve an operation rate of compressibility by easily checking the states of attachment and deposition of the solid matters in the flow path.

BRIEF DESCRIPTION OF DRAWINGS

FIG. 5 is a flowchart showing a procedure of a method for inspecting a centrifugal compressor of one or more embodiments of the present invention.

DETAILED DESCRIPTION OF EMBODIMENTS

Figure 1:
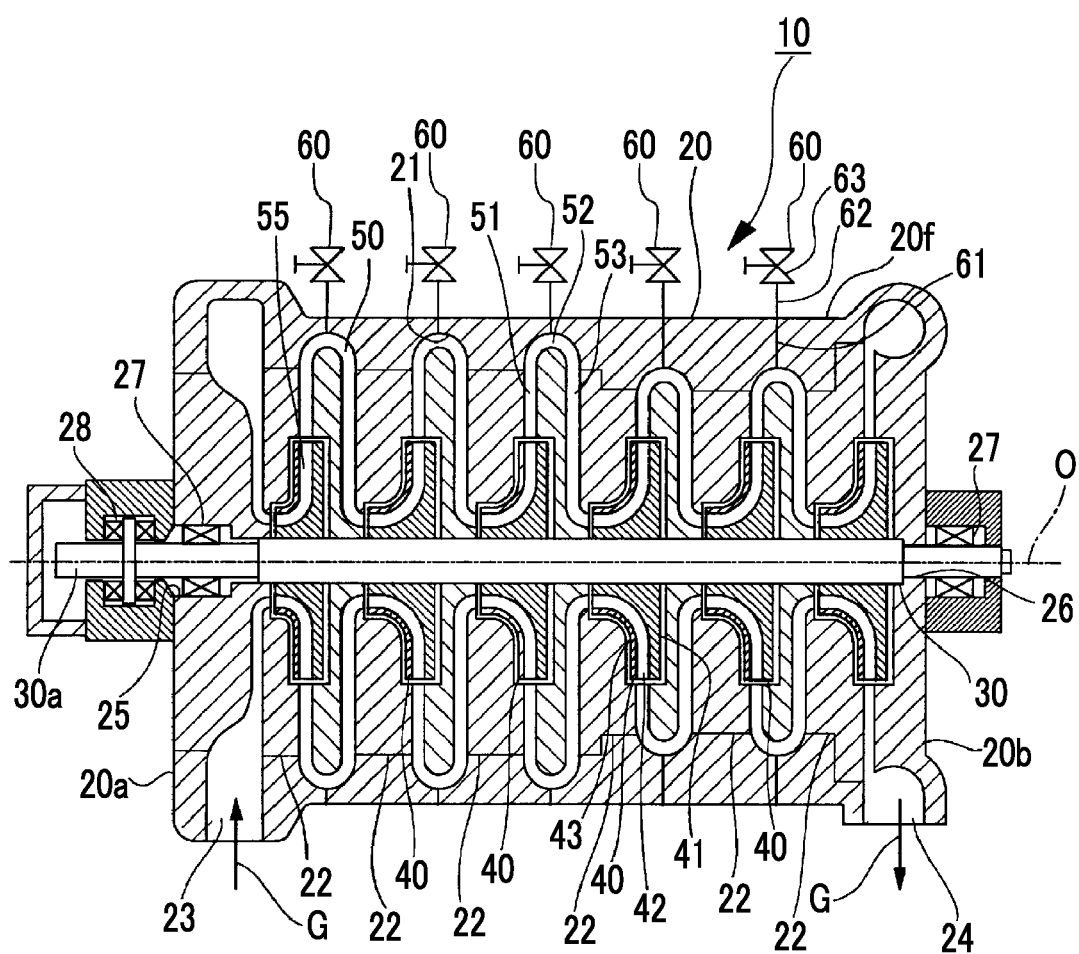
FIG. 1 is a sectional view showing a configuration of a centrifugal compressor which is an example of a rotary machine of one or more embodiments of the present invention.

As shown in FIG. 1, a centrifugal compressor (rotary machine) 10 mainly includes a casing 20, a rotary shaft 30 which is rotatably supported around a center axis O in the casing 20, and impellers 40 which are attached to the rotary shaft 30 and compress a process gas (fluid) G using a centrifugal force.

A plurality of ring members (diaphragms) 22 which are arranged in a direction of a center axis O of the rotary shaft are provided in the casing 20. In addition, an internal space 21 in which an increase in a diameter and a decrease in a diameter are repeated is provided in the casing 20. The impellers 40 are accommodated in the internal space 21.

When the impellers 40 are accommodated, a stationary component side flow path 50 through which the process gas G flowing through the impellers 40 flows from an upstream side toward a downstream side is formed at a position between the impellers 40.

A suction port 23 through which the process gas G flows from the outside to the stationary component side flow path 50 is provided on one end portion 20a of the casing 20. In addition, a discharge port 24 which is continued to the stationary component side flow path 50 and through which the process gas G flows to the outside is provided on the other end portion 20b of the casing 20.

Support holes 25 and 26 which support both end portions of the rotary shaft 30 are formed on the one end portion 20a side and the other end portion 20b side of the casing 20. The rotary shaft 30 is rotatably supported by the support holes 25 and 26 around the center axis O via journal bearings 27. In addition, a thrust bearing 28 is provided on the one end portion 20a of the casing 20 and one end side 30a of the rotary shaft 30 is rotatably supported in the direction of the center axis O via the thrust bearing 28.

The plurality of impellers 40 are accommodated in the respective ring members 22 in the casing 20 at intervals therebetween in the direction of the center axis O of the rotary shaft 30. In addition, FIG. 1 shows an example in which six impellers 40 are provided. However, at least one impeller 40 may be provided.

Figure 2:
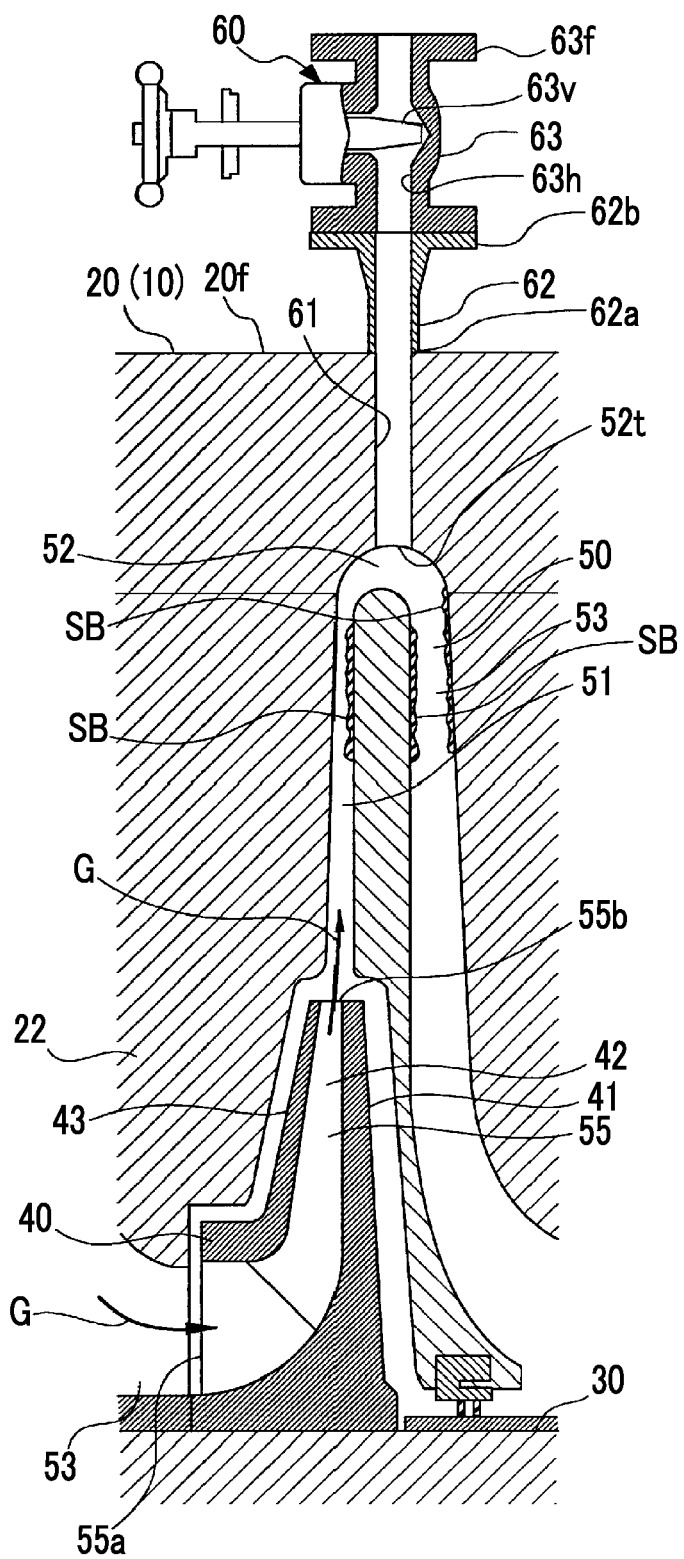
FIG. 2 is an enlarged sectional view showing a main portion of a centrifugal compressor of one or more embodiments.

As shown in FIG. 2, each of the impellers 40 is a so-called closed impeller which includes a disk portion 41, a plurality of blade portion 42, and a cover portion 43, but may be an open impeller in which the cover portion 43 is not provided.

The stationary component side flow path 50 includes a diffuser portion 51, a return bend portion 52, and a return flow path portion 53.

The diffuser portion 51 is formed to extend from the outer peripheral side of the impeller 40 toward the outer peripheral side of the casing 20.

The return bend portion 52 is formed continuously to the outer peripheral portion of the diffuser portion 51. The return bend portion 52 is formed to go around from the outer peripheral portion of the diffuser portion 51 to the other end portion 20b side of the casing 20 in a U shape in a sectional view and to be directed toward the inner peripheral side.

The return flow path portion 53 is formed from the return bend portion 52 toward the inner peripheral side.

In each impeller 40, an impeller side flow path 55 is formed in a space which is surround by the disk portion 41, the cover portion 43, and the blade portions 42 adjacent to each other in the circumferential direction. In each impeller 40, the impeller side flow path 55 is formed such that an end portion 55a of the impeller side flow path 55 facing the one end portion 20a side of the casing 20 faces the end portion of the return flow path portion 53 of the stationary component side flow path 50, and an end portion 55b opposite to the end portion 55a faces the outer peripheral side and faces the diffuser portion 51 of the stationary component side flow path 50.

In the centrifugal compressor 10, the process gas G introduced from the suction port 23 into the stationary component side flow path 50 flows from the end portion 55a close to the inside in the radial direction of the blade portion 42 into the impeller side flow path 55 in each of the impellers 40 rotating around the center axis O along with the rotary shaft 30. The process gas G flowing into the impeller side flow path 55 flows out from the end portion 55b close to the outside in the radial direction of the blade portion 42 toward the outer peripheral side. In addition, the process gas G flows through the impeller side flow path 55 toward the outside in the radial direction, and thus, the process gas G is compressed.

The process gas G flowing out from the impellers 40 of each stage flows the outer peripheral side through the diffuser portion 51 of the stationary component side flow path 50, the flow direction of the process gas G is turned back in the return bend portion 52, and the process gas G are fed into the impellers 40 of the latter stage side through the return flow path portion 53. In this way, the process gas G passes through the impeller side flow paths 55 and the stationary component side flow paths 50 of the impellers 40 provided in multiple stages from the one end portion 20$a$ side of the casing 20 toward the other end portion 20$b$ side thereof, and thus, the process gas G is compressed in multiple stages and is discharged from the discharge port 24.

The centrifugal compressor 10 further includes a connection port part 60 to which a borescope 100 can be connected. In the casing 20, an insertion hole (communication hole) 61 is formed, and the connection port part 60 includes a connection pipe 62 and an open/close valve 63 which can open/close the insertion hole 61.

The insertion hole 61 is formed in the casing 20 to communicate with an outer peripheral surface 20$f$ of the casing and the position facing the inside of the stationary component side flow path 50. In one or more embodiments, the insertion hole 61 is formed to open to an outermost peripheral portion 52$t$ of the return bend portion 52 of the stationary component side flow path 50.

The connection pipe 62 is formed in a tubular shape, and one end 62$a$ of the connection pipe 62 is fixed to the outer peripheral surface 20$f$ of the casing 20 to communicate with the insertion hole 61.

The open/close valve 63 is connected to the other end 62$b$ of the connection pipe 62 by a blot (not shown) or the like. The open/close valve 63 includes a valve body 63$v$ which opens and closes a pipeline 63$h$ which communicates with the connection pipe 62 and the insertion hole 61. In addition, a flange portion 63$f$ in which a diameter is enlarged toward the outer peripheral side is provided on an end portion of the open/close valve 63 on a side opposite to the connection pipe side. The borescope 100 or an oil injection device (not show) described later can be detachably connected to the flange portion 63$f$.

The connection port part 60 is provided on each return bend portion 52 positioned on the outer peripheral sides of the impellers 40 of each stage.

Figure 3:
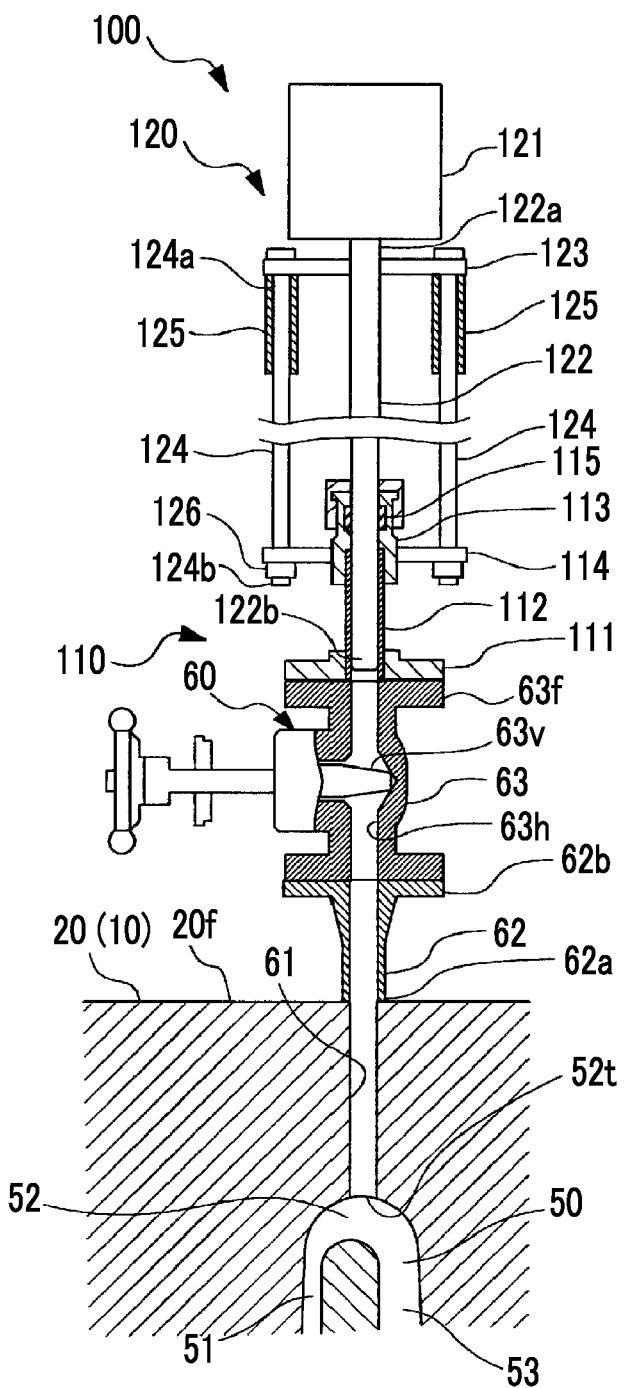
FIG. 3 is a sectional view showing a state where a borescope is mounted on a connection port part of the centrifugal compressor.

As shown in FIG. 3, the borescope (observation device) 100 of one or more embodiments includes a fixation support portion 110 and a scope main body 120.

The fixation support portion 110 includes a flange member 111, a guide tube 112, a sleeve member (guide member) 113, and a support plate 114.

The flange member 111 can be connected to the flange portion 63$f$ of the connection port part 60 by a bolt or the like.

The guide tube 112 is formed in a tubular shape and one end of the guide tube 112 is fixed to the flange member 111. The guide tube 112 communicates with the connection pipe 62 in a state where the flange member 111 is connected to the flange portion 63$f$ of the connection port part 60.

The sleeve member 113 is formed in a tubular shape and is mounted on the other end of the guide tube 112. An annular seal member 115 is provided on the inner peripheral surface of the sleeve member 113.

The support plate 114 is formed in a plate shape and is fixed to the sleeve member 113 to extend from the outer peripheral side of the sleeve member 113. A plurality of guide holes (not shown) are formed in the outer peripheral portion of the support plate 114.

The scope main body 120 includes a main body portion (main body) 121, a scope rod (insertion rod) 122, a support plate 123, guide rods 124, and spacers 125.

An imaging element (not shown), a control unit (not shown), or the like is built in the main body portion 121, and the main body portion 121 converts captured image to electric signals and outputs the electric signals to the outside.

A trailing end portion 122$a$ of the scope rod 122 is fixed to the main body portion 121. A leading end portion 122$b$ side of the scope rod 122 is inserted into the sleeve member 113. The seal member 115 is interposed between the scope rod 122 and the sleeve member 113 to secure seal properties.

An observation optical system such as an imaging lens (not shown) is provided on the leading end portion 122$b$ of the scope rod 122, and a captured image by the observation optical system is optically transmitted to the main body portion 121.

The support plate 123 is formed in a plate shape and is integrally fixed to the outer peripheral surface of the scope rod 122 to extend from the outer peripheral side of the scope rod 122.

Each of the guide rods 124 is formed in a bar shape and a plurality of guide rods 124 are provided on the outer peripheral portion of the support plate 123 at intervals therebetween in the circumferential direction. Each guide rod 124 is provided to be parallel to the scope rod 122 and a trailing end portion 124$a$ thereof is integrally fixed to the support plate 123. A leading end portion 124$b$ side of the guide rod 124 is inserted into the guide hole (not shown) which is formed in the support plate 114 on the fixation support portion 110 side. In addition, a stopper member 126 (nut or the like) protruding from the outer peripheral side of the guide rod 124 is provided on the leading end portion 124$b$ of the guide rod 124.

A plurality of spacers 125 are provided on the outer peripheral portion of the support plate 123 at intervals therebetween in the circumferential direction. Each spacer 125 is integrally fixed to the side of the support plate 123 facing the support plate 114. The spacer 125 is formed in a tubular shape and the guide rod 124 is inserted into the spacer 125.

Figure 4:
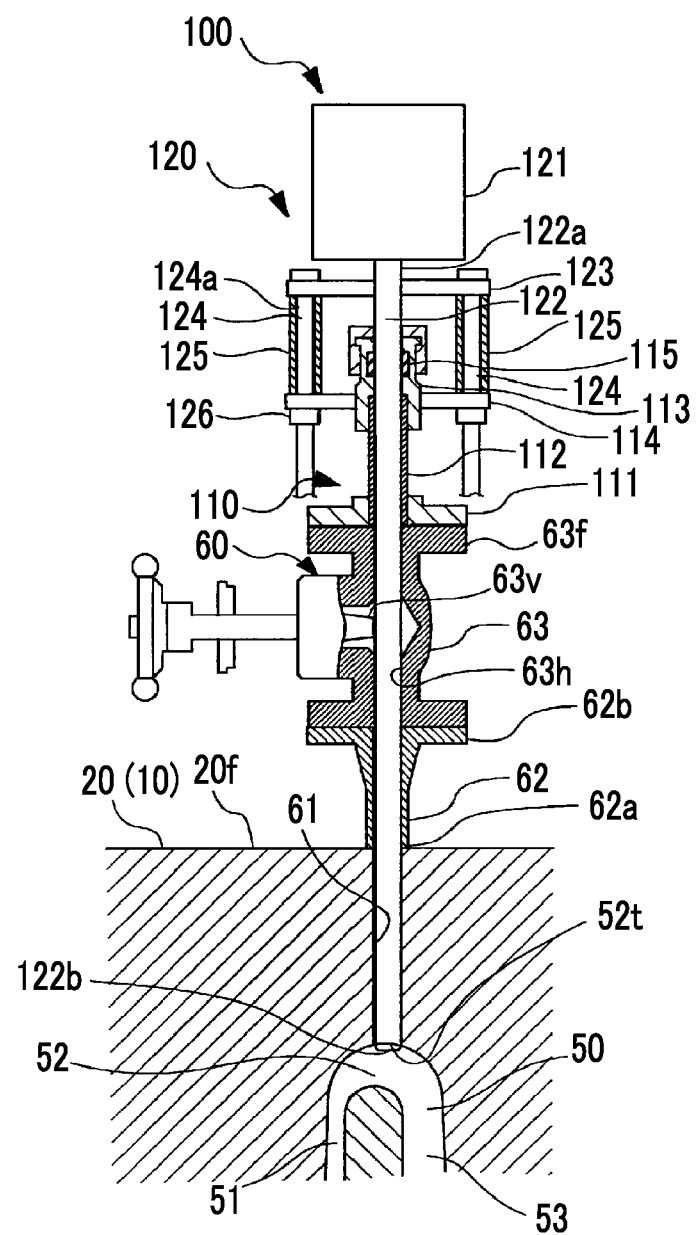
FIG. 4 is a sectional view showing a state where an insertion rod of the borescope mounted on a connection port is inserted into a casing.

As shown in FIGS. 3 and 4, in the borescope 100, the scope main body 120 can move close to and away from the fixation support portion 110 in a central axis direction of the scope rod 122. This is because the scope rod 122 is guided by the guide tube 112 and the guide rods 124 are guided by guide holes (not show) which are formed in the support plate 114 on the fixation support portion 110 side.

As shown in FIG. 4, the movement amount of the scope main body 120 in a direction in which the scope main body 120 moves close to the support plate 114 is regulated by abutting the spacers 125 on the support plate 114. In addition, as shown in FIG. 3, the movement amount of the scope main body 120 in a direction in which the scope main body 120 moves away from the support plate 114 is regulated by the stopper members 126 provided in the leading end portions 124$b$ of the guide rods 124.

Next, a method for inspecting the centrifugal compressor using the above-described borescope 100 will be described with reference to FIG. 5. The connection port part 60 is attached to the casing 20 in advance.

During a normal operation of the centrifugal compressor 10, the open/close valve 63 of each connection port part 60 is closed. Accordingly, the process gas G does not leak from the stationary component side flow path 50 to the outside of the casing 20 through the connection port part 60.

In order to inspect the centrifugal compressor 10, first, as shown in FIG. 3, the flange member 111 of the borescope 100 is connected to the flange portion 63f of the connection port part 60 by a bolt or the like (Step S1). Accordingly, the borescope 100 is mounted on the connection port part 60.

Next, the state of the open/close valve 63 is switched to an open state. Continuously, as shown in FIG. 4, the scope main body 120 moves in the direction in which the scope main body 120 moves close to the support plate 114 (the outer peripheral surface 20f of the casing 20). Accordingly, the scope rod 122 is inserted into the pipeline 63h of the open/close valve 63 of the connection port part 60, the connection pipe 62, and the insertion hole 61 while being guided by the guide rod 124 (Step S2). The scope main body 120 moves until each spacer 125 abuts on the support plate 114. Accordingly, the leading end portion 122b of the scope rod 122 is exposed to the inside of the stationary component side flow path 50 from the outmost peripheral port 52t of the return bend portion 52.

In this state, the inside of the stationary component side flow path 50 is observed and imaged by the observation optical system (not shown) such as an imaging lens provided in the leading end portion 122b of the scope rod 122 (Step S3). The captured image is converted into electric signals by the main body portion 121, and for example, the electric signals are output to a monitor device or the like provided in the outside so as to be displayed as an image.

Therefore, an operator observes the inside of the output stationary component side flow path 50 based on the displayed image and checks the state of attachment and deposition of solid matters SB (refer to FIG. 2) in the stationary component side flow path 50. In this way, it is possible to visually inspect the inside of the stationary component side flow path using the borescope 100 without disassembling the centrifugal compressor.

After performing the inspection by the borescope 100, the scope main body 120 moves in the direction in which the scope main body 120 moves away from the fixation support portion 110. Accordingly, the scope rod 122 is withdrawn from the pipeline 63h of the open/close valve 63 of the connection port part 60, the connection pipe 62, and the insertion hole 61. The scope main body 120 moves until the movement of the support plate 114 stops by the stopper member 126 provided in the leading end portion 124b of the guide rod 124, and the open/close valve 63 of the connection port part 60 is closed (Step S4).

Thereafter, the flange member 111 is separated from the flange portion 63f of the connection port part 60 and the borescope 100 is detached from the connection port part 60 (Step S5).

As a result of the inspection performed by the borescope 100, in a case where it is determined that the states of attachment and deposition of the solid matters SB in the stationary component side flow path 50 are states to remove the solid matters SB, an oil injection device (injection device: not shown) is connected to the connection port part 60.

Here, the oil injection device (not shown) has an injection nozzle (not shown) which is inserted into the pipeline 63h of the open/close valve 63, the connection pipe 62, and the insertion hole 61. In a state where the nozzle is inserted into the pipeline 63h of the open/close valve 63, the connection pipe 62, and the insertion hole 61, oil for a cleaning solution is injected from the leading end portion of the nozzle (Step S6). The solid matters SB inside the stationary component side flow path 50 are removed by the injected oil for a cleaning solution.

In the method for inspecting the centrifugal compressor 10 of one or more of the above-described embodiments, the step (Step S1) of connecting the scope main body 120 of the borescope 100 to the connection port part 60 having the open/close valve 63, the scope main body 120 being connected to the connection port part 60 in a state where the open/close valve 63 is closed, the step (Step S2) of opening the open/close valve 63 and inserting the scope rod 122 of the borescope 100 into the insertion hole 61, the step (Step S3) of observing the inside of the stationary component side flow path 50 by the observation optical system provided in the leading end portion of the scope rod 122, the step (Step S4) of withdrawing the scope rod 122 from the insertion hole 61 and closing the open/close valve 63, and the step (Step S5) of detaching the scope main body 120 of the borescope 100 from the connection port part 60 are performed.

According to the inspection method, it is possible to observe the inside of the stationary component side flow path 50 by inserting the borescope 100 into the stationary component side flow path 50 from the outside without disassembling the centrifugal compressor 10. Accordingly, it is possible to decrease a labor and costs of maintenance by easily checking states of attachment and deposition of solid matters SB in the gas flow path inside the casing 20.

In addition, since attachment and detachment of the borescope 100 are performed in a state where the open/close valve 63 provided in the connection port part 60 is closed, it is possible to perform the inspection even in a state where the centrifugal compressor 10 is operated. Accordingly, it is possible to improve an operation rate of the centrifugal compressor 10.

In addition, the seal member 115 which seals a portion between the scope rod 122 and the sleeve member 113 is provided on the inner peripheral surface of the sleeve member 113. Accordingly, even when the borescope 100 is inserted into or withdrawn from the connection port part 60, seal properties are maintained, and the process gas G inside the casing 20 cannot be leaked to the outside.

In addition, in the case where it is determined that the solid matters SB are to be removed from the inside of the stationary component side flow path 50 based on the observation image of the inside of the stationary component side flow path obtained by the borescope 100, the oil injection device which injects the cleaning solution is connected to the connection port part 60 such that the cleaning solution is injected into the stationary component side flow path 50.

Accordingly, it is possible to inject the cleaning solution at appropriate timing to remove the solid matters SB.

In addition, the connection port part 60 can be connected to the oil injection device including the injection nozzle for injecting the cleaning solution which removes the solid matters SB attached to the inside of the stationary component side flow path 50. Accordingly, the connection port part 60 can be shared by the borescope 100 and the oil injection device.

In addition, if the connection port part 60 for connecting the oil injection device is provided in the existing centrifugal compressor 10, it is possible to inspect the attachment states of the solid matters SB by connecting the borescope 100 to the connection port part 60. That is, one or more of the above-described embodiments can be applied to the existing centrifugal compressor 10 at low costs.

In addition, the connection port part 60 is provided such that the insertion hole 61 faces the return bend portion 52 at which the stationary component side flow path 50 is curved (or bent). If the inside of the stationary component side flow path 50 is observed by disposing the leading end portion 122*b* of the scope rod 122 in the insertion hole 61, it is possible to easily observe the return bend portion 52 at which the solid matters SB are easily attached. In addition, it is easily possible to observe the diffuser portion 51 positioned on one side of the return bend portion 52 and the return flow path portion 53 positioned on the other side of the return bend portion 52.

In addition, even when the leading end portion 122*b* of the scope rod 122 is inserted into the stationary component side flow path 50 during the operation of the centrifugal compressor 10, since the flow rate of the process gas G in the return bend portion 52 is slow, it is possible to decrease loss applied to the flow of the process gas G.

In addition, the present invention is not limited to the above-described embodiments and design thereof can be modified within a scope which does not depart from the gist of the present invention.

For example, the installation position of the connection port part 60, the direction of the insertion hole 61, or the like may be arbitrarily set as long as the borescope 100 can be mounted.

In addition, the configuration of the borescope 100 or the connection port part 60 shown in the above-described embodiments is only an example, and other configurations may be adopted as long as they can exert required functions.

In addition, in the above-described embodiments, the connection port part 60 is shared by the borescope 100 and the oil injection device. However, the connection port part 60 for the borescope 100 and the connection port part for the oil injection device may be separately provided.

In addition, in order to decrease the generation of the solid matters SB, a water injection device which decrease the temperature of the flow path by injecting water to the flow path inside the casing 20 may be connected to the connection port part 60 to which the borescope 100 is connected.

Moreover, the configuration of the centrifugal compressor 10 is merely a schematic configuration in the above-described embodiments, and may be appropriately changed.

INDUSTRIAL APPLICABILITY

Since the observation is performed by connecting the main body of the observation device to the connection port provided in the communication hole which communicates with the outside of the rotary machine and the flow path of a fluid, it is possible to decrease a labor and costs of maintenance and improve an operation rate of compressibility by easily checking the states of attachment and deposition of the solid matters in the flow path, injecting the cleaning solution at appropriate timing, or the like Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

10: centrifugal compressor (rotary machine)
20: casing
20*a*: one end portion
20*b*: other end portion
20*f*: outer peripheral surface
21: internal space
22: ring member
23: suction port
24: discharge port
25, 26: support hole
27: journal bearing
28: thrust bearing
30: rotary shaft
30*a*: one end side
40: impeller
41: disk portion
42: blade portion
43: cover portion
50: stationary component side flow path (flow path)
51: diffuser portion
52: return bend portion
52*t*: outermost peripheral portion
53: return flow path portion
55: impeller side flow path
55*a*: end portion
55*b*: end portion
60: connection port part
61: insertion hole (communication hole)
62: connection pipe
62*a*: one end
62*b*: other end
63: open/close valve
63*f*: flange portion
63*h*: pipeline
63*v*: valve body
100: borescope (observation device)
110: fixation support portion
111: flange member
112: guide tube
113: sleeve member (guide member)
114: support plate
115: seal member
120: scope main body
121: main body portion (main body)
122: scope rod (insertion rod)
122*a*: trailing end portion
122*b*: leading end portion
123: support plate
124: guide rod
124*a*: trailing end portion
124*b*: leading end portion
125: spacer
126: stopper member
G: process gas (fluid)
O: center axis
SB: solid matter

The invention claimed is:

1. A method for inspecting a centrifugal compressor having a rotary shaft, a plurality of impellers provided along a longitudinal direction of the rotary shaft, and a plurality of stationary components corresponding to the plurality of impellers, wherein a plurality of flow paths through which a fluid flows is formed between the plurality of impellers, a plurality of communications holes corresponding to the plurality of stationary components is formed to connect an external circumference of the centrifugal compressor and the plurality of flow paths, and a plurality of connection ports having a plurality of open/close valves for opening/closing the plurality of communication holes respectively is provided in the centrifugal compressor, the method comprising:

connecting a body of an observation device to a first connection port of the plurality of connection ports, wherein the first connection port communicates with a first communication hole among the plurality of communication holes in a state where the plurality of open/close valves are closed;

opening a first open/close valve of the plurality of open/close valves and inserting an insertion rod protruding from the main body of the observation device into the first communication hole;

observing an inside of a flow path among the plurality of flow paths by an observation optical system provided at a leading end portion of the insertion rod;

withdrawing the insertion rod from the first communication hole and closing the first open/close valve; and detaching the main body of the observation device from the first connection port.

2. The method for inspecting a centrifugal compressor according to claim 1, further comprising:

connecting an injection device having an injection nozzle for injecting a cleaning solution into the first connection port and injecting the cleaning solution into the plurality of flow paths in a case where it is determined that solid matters are to be removed from the inside of the plurality of flow paths based on an observation image of the inside of the plurality of flow paths obtained by the observation device.

3. The method for inspecting a centrifugal compressor according to claim 1, wherein the plurality of communication holes corresponding to the plurality of connection ports is provided to face a portion in which the plurality of flow paths is curved or bent.

4. A system comprising:

a centrifugal compressor having a rotary shaft;

a plurality of impellers of the centrifugal compressor, wherein the impellers are provided along a longitudinal direction of the rotary shaft;

a plurality of stationary components of the centrifugal compressor, wherein the stationary components correspond to the plurality of impellers;

a casing of the centrifugal compressor, wherein the casing is configured to accommodate the plurality of impellers and the plurality of stationary components therein, wherein a plurality of flow paths through which a fluid flows is formed between the plurality of impellers and the plurality of stationary components, and a plurality of communication holes is formed to open on an outer circumference surface of the casing for communicating an outside of the rotary machine and the plurality of flow paths;

a plurality of open/close valves attached to the casing and provided outside the casing, wherein the plurality of open/close valves opens/closes the plurality of communication holes, respectively;

a borescope comprising an insertion rod;

a tubular guide member that can be selectively connected to each of the plurality of open/close valves individually, wherein when the tubular guide member is attached to one of the plurality of open/close valves, the open/close valve to which the tubular guide member is attached can be opened such that the insertion rod of the borescope device can be inserted through the tubular guide member and into the casing; and a seal member provided on an inner peripheral surface of the tubular guide member and that seals a portion between the tubular guide member and the insertion rod.

5. The system according to claim 4, further comprising an injection device for injecting a cleaning solution to remove solid matters in the plurality of flow paths, wherein the injection device can be selectively connected to each of the plurality of open/close valves.

* * * * *